United States Patent
Brown et al.

(10) Patent No.: US 8,519,050 B2
(45) Date of Patent: *Aug. 27, 2013

(54) RESIN FOR COMPOSITE STRUCTURES

(75) Inventors: Randall J. Brown, Puyallup, WA (US);
Semen Kharchenko, Ann Arbor, MI (US); Harry D. Coffee, Aurora, OH (US); Icheng Huang, Ann Arbor, MI (US)

(73) Assignee: Milgard Manufacturing Incorporated, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,851

(22) Filed: Nov. 8, 2010

(65) Prior Publication Data

US 2011/0054108 A1   Mar. 3, 2011

Related U.S. Application Data

(63) Continuation of application No. 11/287,141, filed on Nov. 23, 2005, now Pat. No. 7,875,675.

(51) Int. Cl.
   *C08G 18/08*    (2006.01)
   *C08G 63/60*    (2006.01)
   *C08L 75/00*    (2006.01)
   *C08L 67/00*    (2006.01)
   *C08L 73/00*    (2006.01)
   *C08L 77/00*    (2006.01)
   *C08L 79/00*    (2006.01)
   *C09K 3/00*     (2006.01)

(52) U.S. Cl.
   USPC ........ 524/589; 524/101; 524/599; 252/182.2; 252/182.21; 252/182.22

(58) Field of Classification Search
   USPC ......... 524/101, 589, 599; 252/182.2, 182.21, 252/182.22
   See application file for complete search history.

(56) References Cited

U.S. PATENT DOCUMENTS

| | | | |
|---|---|---|---|
| 2,384,318 A | 9/1945 | Bleu | |
| 2,628,401 A | 2/1953 | Fiedler | |
| 2,684,318 A | 7/1954 | Meek | |
| 2,751,320 A | 6/1956 | Hopkins, et al. | |
| 2,871,911 A | 2/1959 | Goldsworthy et al. | |
| 3,291,878 A | 12/1966 | Boggs | |
| 3,391,101 A | 7/1968 | Kelly et al. | |

(Continued)

FOREIGN PATENT DOCUMENTS

| | | |
|---|---|---|
| CN | 1469810 A | 1/2004 |
| EP | 0 269 197 A2 | 6/1988 |

(Continued)

OTHER PUBLICATIONS

Dow (Voranol 270 data sheet Aug. 2001).*

(Continued)

*Primary Examiner* — Patrick Ryan
*Assistant Examiner* — Aaron Greso
(74) *Attorney, Agent, or Firm* — Rathe Lindenbaum LLP

(57) ABSTRACT

A resin precursor composition includes an isocyanate component, a first polyol having a molecular weight of between approximately 600 and 800 and an OH index of between approximately 200 and 300 mgOH/g, and a second polyol having a molecular weight of between approximately 100 and 300 and an OH index of between approximately 800 and 1,200 mgOH/g.

27 Claims, 5 Drawing Sheets

(56) References Cited

U.S. PATENT DOCUMENTS

| | | | |
|---|---|---|---|
| 3,424,607 A * | 1/1969 | Coscia | 427/133 |
| 3,442,888 A | 5/1969 | Degginger et al. | |
| 3,523,331 A | 8/1970 | Weeks | |
| 3,524,222 A | 8/1970 | Gregory et al. | |
| 3,529,050 A | 9/1970 | Smith | |
| 3,556,888 A | 1/1971 | Goldsworthy | |
| 3,640,997 A | 2/1972 | Fijal | |
| 3,711,444 A | 1/1973 | Allen et al. | |
| 3,873,399 A | 3/1975 | Goldsworthy et al. | |
| 3,905,823 A * | 9/1975 | Piskoti | 106/38.22 |
| 3,960,629 A | 6/1976 | Goldsworthy | |
| 4,012,267 A | 3/1977 | Klein | |
| 4,046,103 A | 9/1977 | Yakuboff | |
| 4,074,480 A | 2/1978 | Burton | |
| 4,082,885 A * | 4/1978 | Rashid et al. | 442/72 |
| 4,085,183 A | 4/1978 | Roe | |
| 4,098,731 A | 7/1978 | Von Bonin et al. | |
| 4,100,013 A | 7/1978 | Medler et al. | |
| 4,111,861 A | 9/1978 | Godlewski | |
| 4,124,573 A | 11/1978 | Watabe et al. | |
| 4,126,742 A | 11/1978 | Carleton et al. | |
| 4,154,563 A | 5/1979 | Johnson | |
| 4,154,634 A | 5/1979 | Shobert et al. | |
| 4,218,543 A | 8/1980 | Weber et al. | |
| 4,244,768 A | 1/1981 | Wiechowski et al. | |
| 4,258,169 A | 3/1981 | Prather et al. | |
| 4,289,563 A | 9/1981 | Wiechowski et al. | |
| RE30,770 E | 10/1981 | Shobert et al. | |
| 4,296,230 A | 10/1981 | Pedain et al. | |
| 4,318,762 A | 3/1982 | Meyer | |
| 4,354,889 A | 10/1982 | Berger | |
| 4,368,226 A | 1/1983 | Mucaria | |
| 4,385,133 A | 5/1983 | Alberino et al. | |
| 4,419,400 A | 12/1983 | Hindersinn | |
| 4,432,174 A | 2/1984 | Grether et al. | |
| 4,462,946 A | 7/1984 | Goldsworthy | |
| 4,479,984 A | 10/1984 | Levy et al. | |
| 4,479,988 A | 10/1984 | Dawson | |
| 4,481,056 A | 11/1984 | Kuhl | |
| 4,515,737 A | 5/1985 | Karino et al. | |
| 4,519,965 A | 5/1985 | Taylor et al. | |
| 4,521,363 A | 6/1985 | Vogel | |
| 4,530,650 A | 7/1985 | Milani | |
| 4,540,781 A | 9/1985 | Barsa | |
| 4,544,679 A * | 10/1985 | Tideswell et al. | 521/116 |
| 4,546,154 A | 10/1985 | Robertson | |
| 4,551,364 A | 11/1985 | Davies | |
| 4,564,540 A | 1/1986 | Davies et al. | |
| 4,581,386 A | 4/1986 | Taylor et al. | |
| 4,581,387 A | 4/1986 | Werner et al. | |
| 4,585,803 A | 4/1986 | Nelson et al. | |
| 4,585,829 A | 4/1986 | Kuo et al. | |
| 4,602,060 A | 7/1986 | Clark et al. | |
| 4,609,682 A | 9/1986 | Weber et al. | |
| 4,640,861 A | 2/1987 | Binnersley et al. | |
| 4,652,472 A | 3/1987 | Davies | |
| 4,661,406 A | 4/1987 | Gruhn et al. | |
| 4,677,157 A | 6/1987 | Jacobs | |
| 4,677,181 A * | 6/1987 | Hohlein et al. | 528/74.5 |
| 4,681,722 A | 7/1987 | Carter et al. | |
| 4,711,912 A | 12/1987 | Snider et al. | |
| 4,753,966 A | 6/1988 | Haas et al. | |
| 4,755,127 A | 7/1988 | Becker | |
| 4,764,537 A | 8/1988 | Horn et al. | |
| 4,766,172 A | 8/1988 | Weber et al. | |
| 4,770,834 A | 9/1988 | Nakasone et al. | |
| 4,777,187 A | 10/1988 | Weber et al. | |
| 4,808,636 A | 2/1989 | Saito et al. | |
| 4,810,429 A | 3/1989 | Mayr | |
| 4,812,343 A | 3/1989 | Kiekhaefer et al. | |
| 4,820,366 A | 4/1989 | Beever et al. | |
| 4,820,743 A | 4/1989 | Ishikawa et al. | |
| 4,857,579 A | 8/1989 | Domeier | |
| 4,863,994 A | 9/1989 | Nelson et al. | |
| 4,868,223 A | 9/1989 | Nelson et al. | |
| 4,876,019 A | 10/1989 | Meyer et al. | |
| 4,883,552 A | 11/1989 | O'Connor et al. | |
| 4,883,690 A | 11/1989 | Carter | |
| 4,892,600 A | 1/1990 | Beever | |
| 4,895,879 A | 1/1990 | Nelson et al. | |
| 4,897,428 A | 1/1990 | Dewhurst et al. | |
| 4,919,878 A | 4/1990 | Pilger et al. | |
| 4,924,631 A | 5/1990 | Davies et al. | |
| 4,935,279 A | 6/1990 | Perko et al. | |
| 4,950,694 A * | 8/1990 | Hager | 521/167 |
| 4,981,877 A | 1/1991 | Carswell | |
| 4,983,453 A | 1/1991 | Beall | |
| 4,984,402 A | 1/1991 | Davies | |
| 5,051,466 A | 9/1991 | Meyer et al. | |
| 5,066,349 A | 11/1991 | Perko et al. | |
| 5,071,939 A | 12/1991 | Fukami et al. | |
| 5,073,413 A | 12/1991 | Koppernaes et al. | |
| 5,079,054 A | 1/1992 | Davies | |
| 5,084,222 A | 1/1992 | Glemet et al. | |
| 5,091,036 A | 2/1992 | Taylor | |
| 5,098,496 A | 3/1992 | Breitigam et al. | |
| 5,114,516 A | 5/1992 | Pilling et al. | |
| 5,120,380 A | 6/1992 | Strachan | |
| 5,122,417 A | 6/1992 | Murakami et al. | |
| 5,123,304 A | 6/1992 | Carmien | |
| 5,137,966 A | 8/1992 | Nodelman | |
| 5,150,983 A | 9/1992 | Bogenhagen | |
| 5,151,483 A | 9/1992 | Harasin et al. | |
| 5,176,775 A | 1/1993 | Montsinger | |
| 5,199,234 A | 4/1993 | Guhl | |
| 5,204,439 A | 4/1993 | Dormish et al. | |
| 5,205,102 A | 4/1993 | Plummer | |
| 5,207,850 A | 5/1993 | Parekh | |
| 5,212,209 A | 5/1993 | Weaver et al. | |
| 5,213,014 A | 5/1993 | Carmien | |
| 5,233,009 A | 8/1993 | Madan et al. | |
| 5,268,050 A | 12/1993 | Azari | |
| 5,294,461 A | 3/1994 | Ishida | |
| 5,310,600 A | 5/1994 | Tsuya et al. | |
| 5,314,983 A | 5/1994 | DeMeuse et al. | |
| 5,322,582 A | 6/1994 | Davies et al. | |
| 5,324,377 A | 6/1994 | Davies | |
| 5,344,853 A | 9/1994 | Knipp et al. | |
| 5,358,583 A | 10/1994 | Hatchadoorian et al. | |
| 5,375,486 A | 12/1994 | Carmien | |
| 5,387,468 A | 2/1995 | Pollet et al. | |
| 5,407,616 A | 4/1995 | Dube | |
| 5,420,186 A | 5/1995 | Dewhurst | |
| 5,439,749 A | 8/1995 | Klasell et al. | |
| 5,447,793 A | 9/1995 | Montsinger | |
| 5,472,646 A | 12/1995 | Uchida et al. | |
| 5,492,583 A | 2/1996 | Fingerson et al. | |
| 5,536,465 A | 7/1996 | Lesko | |
| 5,547,608 A | 8/1996 | Harrison et al. | |
| 5,556,496 A | 9/1996 | Sumerak | |
| 5,578,680 A | 11/1996 | Ando et al. | |
| 5,583,197 A | 12/1996 | Harrison et al. | |
| 5,585,155 A | 12/1996 | Heikkila et al. | |
| 5,594,037 A | 1/1997 | Harrison et al. | |
| 5,603,585 A | 2/1997 | Bruchu et al. | |
| 5,605,762 A | 2/1997 | Harrison et al. | |
| 5,614,575 A | 3/1997 | Kotschwar | |
| 5,617,692 A | 4/1997 | Johnson et al. | |
| 5,618,589 A | 4/1997 | McFarland | |
| 5,632,838 A | 5/1997 | Weidner | |
| 5,643,382 A | 7/1997 | Delimoy et al. | |
| 5,653,923 A | 8/1997 | Spoo et al. | |
| 5,686,187 A | 11/1997 | Turnbach | |
| 5,686,526 A | 11/1997 | Turnbach | |
| 5,687,533 A | 11/1997 | Bruchu | |
| 5,688,301 A | 11/1997 | Brandon et al. | |
| 5,700,390 A | 12/1997 | Turnbach | |
| 5,700,869 A | 12/1997 | Turnbach | |
| 5,716,439 A | 2/1998 | Turnbach | |
| 5,716,487 A | 2/1998 | Sumerak | |
| 5,716,548 A | 2/1998 | Harrison et al. | |
| 5,747,075 A | 5/1998 | Gauchel et al. | |
| 5,750,597 A | 5/1998 | Waitkus | |
| 5,767,181 A | 6/1998 | Nagel et al. | |

| | | | | | | |
|---|---|---|---|---|---|---|
| 5,783,013 | A | | 7/1998 | Beckman et al. | | |
| 5,786,085 | A | * | 7/1998 | Tzeng et al. ........................ 52/57 | | |
| 5,788,013 | A | | 8/1998 | Fu-Chung | | |
| 5,807,514 | A | | 9/1998 | Grinshpun et al. | | |
| 5,824,403 | A | | 10/1998 | Eidenschink | | |
| 5,837,095 | A | | 11/1998 | Bruchu et al. | | |
| 5,837,181 | A | | 11/1998 | Leimbacher et al. | | |
| 5,852,135 | A | | 12/1998 | Kanai et al. | | |
| 5,876,641 | A | | 3/1999 | LeClair et al. | | |
| 5,882,564 | A | | 3/1999 | Puppin | | |
| 5,885,390 | A | | 3/1999 | Alkire et al. | | |
| 5,891,560 | A | | 4/1999 | Edwards et al. | | |
| 5,895,718 | A | | 4/1999 | Ishimura et al. | | |
| 5,906,704 | A | | 5/1999 | Matsuura et al. | | |
| 5,910,352 | A | | 6/1999 | Tingley | | |
| 5,912,315 | A | | 6/1999 | Horiie | | |
| 5,935,368 | A | | 8/1999 | Tingley | | |
| 5,948,505 | A | | 9/1999 | Puppin | | |
| 5,950,393 | A | | 9/1999 | Stecker | | |
| 5,954,904 | A | | 9/1999 | Rokicki | | |
| 5,955,013 | A | | 9/1999 | Grinshpun et al. | | |
| 5,960,677 | A | | 10/1999 | Carmien | | |
| 5,962,561 | A | | 10/1999 | Turshani et al. | | |
| 5,972,503 | A | | 10/1999 | Woodside | | |
| 5,973,099 | A | | 10/1999 | Nodelman et al. | | |
| 5,976,610 | A | | 11/1999 | Scholz et al. | | |
| 5,980,680 | A | | 11/1999 | Miller | | |
| 6,007,656 | A | | 12/1999 | Heikkila et al. | | |
| 6,015,856 | A | | 1/2000 | Matsushita et al. | | |
| 6,020,063 | A | | 2/2000 | Riffle et al. | | |
| 6,023,903 | A | | 2/2000 | Stecker | | |
| 6,033,203 | A | | 3/2000 | Christensen et al. | | |
| 6,037,049 | A | | 3/2000 | Tingley | | |
| 6,043,313 | A | | 3/2000 | Brink et al. | | |
| 6,048,427 | A | | 4/2000 | Gauchel et al. | | |
| 6,051,643 | A | | 4/2000 | Hasegawa et al. | | |
| 6,054,207 | A | | 4/2000 | Finley | | |
| 6,092,340 | A | | 7/2000 | Simmons | | |
| 6,099,910 | A | | 8/2000 | Woodside | | |
| 6,106,944 | A | | 8/2000 | Heikkila et al. | | |
| 6,122,877 | A | | 9/2000 | Hendrickson et al. | | |
| 6,179,945 | B1 | | 1/2001 | Greenwood et al. | | |
| 6,197,412 | B1 | | 3/2001 | Jambois | | |
| 6,211,280 | B1 | | 4/2001 | Schell | | |
| 6,227,075 | B1 | | 5/2001 | Carmien | | |
| 6,234,048 | B1 | | 5/2001 | Carmien | | |
| 6,262,217 | B1 | | 7/2001 | Tallmadge et al. | | |
| 6,268,047 | B1 | | 7/2001 | Mulder et al. | | |
| 6,309,732 | B1 | | 10/2001 | Lopez-Anido et al. | | |
| 6,342,172 | B1 | | 1/2002 | Finley | | |
| 6,346,160 | B1 | | 2/2002 | Puppin | | |
| 6,357,197 | B1 | | 3/2002 | Serino et al. | | |
| 6,387,179 | B1 | | 5/2002 | Anderson et al. | | |
| 6,395,210 | B1 | | 5/2002 | Head et al. | | |
| 6,395,823 | B1 | | 5/2002 | Brink et al. | | |
| 6,420,493 | B1 | | 7/2002 | Ryckis-Kite et al. | | |
| 6,448,364 | B1 | | 9/2002 | Clatty et al. | | |
| 6,467,118 | B2 | | 10/2002 | Dumlao et al. | | |
| 6,493,914 | B2 | | 12/2002 | Kaiser et al. | | |
| 6,495,091 | B1 | | 12/2002 | Manson et al. | | |
| 6,531,010 | B2 | | 3/2003 | Puppin | | |
| 6,533,882 | B2 | | 3/2003 | Woodside | | |
| 6,548,616 | B1 | | 4/2003 | Schrock et al. | | |
| 6,565,976 | B1 | | 5/2003 | Qureshi et al. | | |
| 6,572,719 | B2 | | 6/2003 | Fecko et al. | | |
| 6,592,799 | B1 | | 7/2003 | Christensen et al. | | |
| 6,610,239 | B2 | | 8/2003 | McLaren | | |
| 6,630,231 | B2 | | 10/2003 | Perez et al. | | |
| 6,682,814 | B2 | | 1/2004 | Hendrickson et al. | | |
| 6,735,916 | B2 | | 5/2004 | Peshkam et al. | | |
| 6,737,158 | B1 | | 5/2004 | Thompson | | |
| 6,746,175 | B1 | | 6/2004 | Gonnerman et al. | | |
| 6,746,747 | B2 | | 6/2004 | Davies et al. | | |
| 6,764,057 | B2 | | 7/2004 | Fanucci et al. | | |
| 6,793,855 | B2 | | 9/2004 | Cheolas et al. | | |
| 6,808,788 | B2 | | 10/2004 | Bogner | | |
| 6,824,718 | B2 | | 11/2004 | Eitzman et al. | | |
| 6,827,896 | B2 | | 12/2004 | Christensen et al. | | |
| 6,837,007 | B2 | | 1/2005 | Floyd et al. | | |
| 6,872,273 | B2 | | 3/2005 | Davies et al. | | |
| 6,881,288 | B2 | | 4/2005 | Davies et al. | | |
| 6,893,524 | B2 | | 5/2005 | Green | | |
| 6,902,811 | B2 | | 6/2005 | Oosedo et al. | | |
| 2001/0014250 | A1 | | 8/2001 | Plummer et al. | | |
| 2001/0031594 | A1 | | 10/2001 | Perez et al. | | |
| 2001/0032430 | A1 | | 10/2001 | Peshkam et al. | | |
| 2002/0010973 | A1 | | 1/2002 | Dumlao et al. | | |
| 2002/0015820 | A1 | | 2/2002 | Puppin | | |
| 2002/0031664 | A1 | | 3/2002 | Kaiser et al. | | |
| 2002/0038684 | A1 | | 4/2002 | Puppin | | |
| 2002/0045690 | A1 | | 4/2002 | Cheolas et al. | | |
| 2002/0061981 | A1 | | 5/2002 | Donald et al. | | |
| 2002/0108699 | A1 | | 8/2002 | Cofer et al. | | |
| 2002/0121720 | A1 | | 9/2002 | Davies et al. | | |
| 2002/0121722 | A1 | | 9/2002 | Davies et al. | | |
| 2002/0123287 | A1 | | 9/2002 | Davies et al. | | |
| 2002/0123288 | A1 | | 9/2002 | Davies et al. | | |
| 2002/0190434 | A1 | | 12/2002 | Eitzman et al. | | |
| 2003/0003265 | A1 | | 1/2003 | Davies et al. | | |
| 2003/0100621 | A1 | * | 5/2003 | Loh et al. ........................ 521/82 | | |
| 2003/0176561 | A1 | | 9/2003 | Joshi et al. | | |
| 2003/0198780 | A1 | | 10/2003 | Campese et al. | | |
| 2004/0025454 | A1 | | 2/2004 | Burgess | | |
| 2004/0081816 | A1 | | 4/2004 | Pyzik et al. | | |
| 2004/0084304 | A1 | | 5/2004 | Thompson | | |
| 2004/0094859 | A1 | | 5/2004 | Cheolas et al. | | |
| 2004/0106726 | A1 | | 6/2004 | Joshi et al. | | |
| 2004/0144478 | A1 | | 7/2004 | Green | | |
| 2004/0202852 | A1 | | 10/2004 | De Neef et al. | | |
| 2004/0213952 | A1 | | 10/2004 | Takemura et al. | | |
| 2004/0214007 | A1 | | 10/2004 | Brown et al. | | |
| 2004/0247882 | A1 | | 12/2004 | Kouchi et al. | | |
| 2005/0008804 | A1 | | 1/2005 | Davies et al. | | |
| 2005/0048273 | A1 | | 3/2005 | Ryan | | |
| 2005/0056362 | A1 | | 3/2005 | Benson et al. | | |
| 2005/0074593 | A1 | | 4/2005 | Day et al. | | |
| 2005/0167030 | A1 | | 8/2005 | Davies et al. | | |
| 2005/0191476 | A1 | | 9/2005 | Oosedo et al. | | |
| 2007/0113983 | A1 | | 5/2007 | Brown et al. | | |
| 2007/0116941 | A1 | | 5/2007 | Brown et al. | | |
| 2007/0117921 | A1 | | 5/2007 | Brown et al. | | |

FOREIGN PATENT DOCUMENTS

| | | |
|---|---|---|
| EP | 0 480 951 B1 | 9/1993 |
| EP | 0 517 702 B1 | 5/1996 |
| EP | 0 802 851 B1 | 12/1999 |
| EP | 0 918 603 B1 | 3/2001 |
| EP | 1 094 042 A1 | 4/2001 |
| EP | 0 867 270 B1 | 4/2002 |
| EP | 0 747 205 B1 | 8/2002 |
| EP | 1 287 971 A1 | 3/2003 |
| EP | 0 958 445 B1 | 5/2003 |
| EP | 0 931 635 B1 | 3/2005 |
| GB | 0 943 151 | 11/1963 |
| GB | 1 206 946 | 9/1970 |
| GB | 2 143 770 A | 2/1985 |
| GB | 2 383 975 B | 4/2005 |
| JP | 01 186514 A | 7/1989 |
| JP | 05 318608 A2 | 12/1993 |
| JP | 08 230060 A2 | 9/1996 |
| JP | 10 086287 A1 | 4/1998 |
| JP | 2002 256038 A | 9/2002 |
| WO | WO 91/00409 A1 | 1/1991 |
| WO | WO 92/03277 A1 | 3/1992 |
| WO | WO 94/12341 A1 | 6/1994 |
| WO | WO 94/15765 A1 | 7/1994 |
| WO | WO 96/12863 A1 | 5/1996 |
| WO | WO 96/21551 A1 | 7/1996 |
| WO | WO 97/28956 A1 | 8/1997 |
| WO | WO 98/34001 A1 | 8/1998 |
| WO | WO 00/65188 A1 | 11/2000 |
| WO | WO 00/78529 A1 | 12/2000 |
| WO | WO 02/16482 A2 | 2/2002 |
| WO | WO 02/34502 A2 | 5/2002 |
| WO | WO 2004/067662 A2 | 8/2004 |
| WO | WO 2005/049301 A2 | 6/2005 |

| WO | WO 2007/061470 A1 | 5/2007 |
| WO | WO 2007/061472 A1 | 5/2007 |
| WO | WO 2007/061473 A1 | 5/2007 |

OTHER PUBLICATIONS

BASF (Quadrol Technical Bulletin BASF Aug. 2001) Bayer (MDI Monomers Bayer Oct. 1998).*
Bayer (MDI Monomers Bayer Oct. 1998).*
Williams, Landel and Ferry Journal of the American Chemical Society vol. 77 No. 14 Jul. 20, 1955 pp. 3701-3707.*
World Health Organization; Environmental Health Criteria # 209; PDF available Nov. 30, 2004 printed 1998; Geneva.*
Connolly et al., Pultruding Polyurethane Composite Profiles: Practical Guidelines for Injection Box Design, Component Metering Equipment and Processing, Composites 2005 Convention and Trade Show American Composites Manufacturers Association, Sep. 28-30, 2005, 9 pages.
Dave, Raju S.; Loos, Alfred C. Processing of Composites. Hanser Publishers. p. 320, Online version available at: http://knovel.com/web/portal/browse/display?_EXT_KNOVEL_DISPLAY_bookid=997&VerticalID=0.
H. Ishida et al., "RIM—Pultrusion of Thermoplastic Matrix Composites", Composite Polymers, vol. 4, No. 4, Jan. 1991, pp. 1-11.
Huntsman Polyurethanes Product Line, 2008, 6 pages.
Intent to Grant for European Application No. 06801977.7, mail date Dec. 23, 2008, 4 pages.
Intent to Grant for European Application No. 06813593.8, mail date Aug. 17, 2009, 7 pages.
International Preliminary Report on Patentability for International Application No. PCT/US2006/032557, International filing date Aug. 21, 2006, mail date Mar. 17, 2008, 8 pages.
International Preliminary Report on Patentability for International Application No. PCT/US2006/032576, International filing date Aug. 21, 2006, mail date Mar. 17, 2008, 7 pages.
International Search Report for PCT/2006/032555; date of mailing Mar. 5, 2007; 2 pgs.
International Search Report for PCT/US2006/032556, date of mailing Jan. 23, 2007, 2 pgs.
International Search Report for PCT/US2006/032557, date of mailing, Jan. 15, 2007, 2 pages.
International Search Report for PCT/US2006/032557; date of mailing Jan. 15, 2007; 2 pgs.
International Search Report for PCT/US2006/032576, date of mailing Feb. 14, 2007, 2 pgs.
Office Action for Chinese Application No. 200680043249.4 with translation, mail date Jan. 8, 2010, 4 pages.
Office Action for European Application No. 06801976.6, mail date Mar. 11, 2010, 2 pages.
Office Action for European Application No. 06813587.0, mail date Mar. 11, 2010, 3 pages.
Office Action for European Application No. 06813593.8, mail date Feb. 2, 2009, 3 pages.
Office Action for European Application No. 06813593.8, mail date Sep. 12, 2008, 3 pages.
Office Action for Mexican Application No. MX/a/2008/006446, mail date Mar. 23, 2010, 2 pages.
PCT Demand, Chapter II, for International application No. PCT/US2006/032557, International filing date Aug. 21, 2006, 16 pages.
PCT Demand, Chapter II, for International application No. PCT/US2006/032576, International filing date Aug. 21, 2006, 15 pages.
PCT Written Opinion of the International Preliminary Examining Authority, for International application No. PCT/US2006/032557, International filing date Aug. 21, 2006, mail date Feb. 8, 2008, 14 pages.
PCT Written Opinion of the International Preliminary Examining Authority, for International application No. PCT/US2006/032576, International filing date Aug. 21, 2006, mail date Feb. 7, 2008, 14 pages.
Pluracol 858 Technical Bulletin, Aug. 2001, 1 page.
Response to Office Action for European Application No. 06813593.8, mail date May 19, 2009, 8 pages.
Response to Office Action for European Application No. 06813593.8, mail date Nov. 11, 2008, 16 pages.
UPSTO, Amendment and Reply for U.S. Appl. No. 11/287,140, dated May 4, 2009 (14 pgs.).
UPSTO, Final Office Action for U.S. Appl. No. 11/287,143 dated Apr. 13, 2009 (12 pgs.).
UPSTO, Non-Final Office Action for U.S. Appl. No. 11/287,140, dated Feb. 4, 2009 (14 pgs.).
UPSTO, Non-Final Office Action for U.S. Appl. No. 11/287,142, dated May 12, 2009, 13 pages.
UPSTO, Non-Final Office Action for U.S. Appl. No. 11/287,143, dated Oct. 15, 2008, 13 pages.
UPSTO, Reply and Amendment for U.S. Appl. No. 11/287,143, dated Jan. 15, 2009, 10 pages.
USPTO, Advisory Action for U.S. Appl. No. 11/287,143, dated Aug. 26, 2009, 10 pages.
USPTO, Amendment and Reply for U.S. Appl. No. 11/287,143, dated Aug. 13, 2009, 11 pages.
USPTO, Amendment and Reply for U.S. Appl. No. 11/287,142, dated Aug. 12, 2009, 20 pages.
USPTO, Amendment and Reply for U.S. Appl. No. 11/287,142, dated Jan. 28, 2009, 10 pages.
USPTO, Amendment and Reply for U.S. Appl. No. 11/287,143, dated Jun. 30, 2008, 7 pages.
USPTO, Amendment and Reply for U.S. Appl. No. 11/287,142, dated Apr. 15, 2010, 20 pages.
USPTO, Final Office Action for U.S. Appl. No. 11/287,140, dated Jul. 16, 2009, 16 pages.
USPTO, Non-Final Office Action for U.S. Appl. No. 11/287,142, dated Dec. 30, 2008, 5 pages.
USPTO, Non-Final Office Action for U.S. Appl. No. 11/287,143, dated May 30, 2008, 7 pages.
USPTO, Non-Final Office Action for U.S. Appl. No. 11/287,142, mail date Dec. 15, 2009, 13 pages.
USPTO, Office Action for U.S. Appl. No. 11/287,140, mail date Mar. 8, 2010, 20 pages.
USPTO, Office Action for U.S. Appl. No. 11/287,143, mail date Dec. 9, 2009, 18 pages.
USPTO, Request for Continued Examination and Amendment and Reply for U.S. Appl. No. 11/287,140, dated Nov. 13, 2009, 15 pages.
USPTO, Request for Continued Examination and Amendment and Reply for U.S. Appl. No. 11/287,143, dated Sep. 23, 2009, 14 pages.
USPTO, Response to Office Action for U.S. Appl. No. 11/287,143, mail date Mar. 9, 2010, 11 pages.
Written Opinion of the International Searching Authority for International Application No. PCT/US2006/032555; international filing date Aug. 21, 2006; 5 pgs.
Written Opinion of the International Searching Authority for International Application No. PCT/US2006/032556; international filing date Aug. 21, 2006; 5 pgs.
Written Opinion of the International Searching Authority for International Application No. PCT/US2006/032576; international filing date Aug. 21, 2006; 4 pgs.
Written Opinion of the International Searching Authority for International Application No. PCT/US2006/032557; international filing date Aug. 21, 2006; 4 pgs.
Advisory Action for U.S. Appl. No. 11/287,141, mailed Nov. 12, 2008, 4 pages.
Notice of Allowance for U.S. Appl. No. 11/287,141, mailed Jul. 9, 2010, 6 pages.
Office Action for Chinese Application No. 200680043248.X with English translation, dated Apr. 22, 2010, 12 pages.
Office Action for U.S. Appl. No. 11/287,141, mailed Jul. 24, 2008, 15 pages.
Office Action for U.S. Appl. No. 11/287,141, mailed Mar. 18, 2009, 14 pages.
Office Action for U.S. Appl. No. 11/287,141, mailed May 12, 2010, 5 pages.
Office Action for U.S. Appl. No. 11/287,141, mailed Nov. 20, 2007, 15 pages.
Office Action for U.S. Appl. No. 11/287,141, mailed Oct. 8, 2009, 15 pages.

Response to Office Action for U.S. Appl. No. 11/287,141, dated Apr. 21, 2008, 14 pages.
Response to Office Action for U.S. Appl. No. 11/287,141, dated Dec. 23, 2008, 16 pages.
Response to Office Action for U.S. Appl. No. 11/287,141, dated Feb. 8, 2010, 18 pages.
Response to Office Action for U.S. Appl. No. 11/287,141, dated Jun. 18, 2009, 18 pages.
Response to Office Action for U.S. Appl. No. 11/287,141, dated Oct. 24, 2008, 13 pages.

* cited by examiner

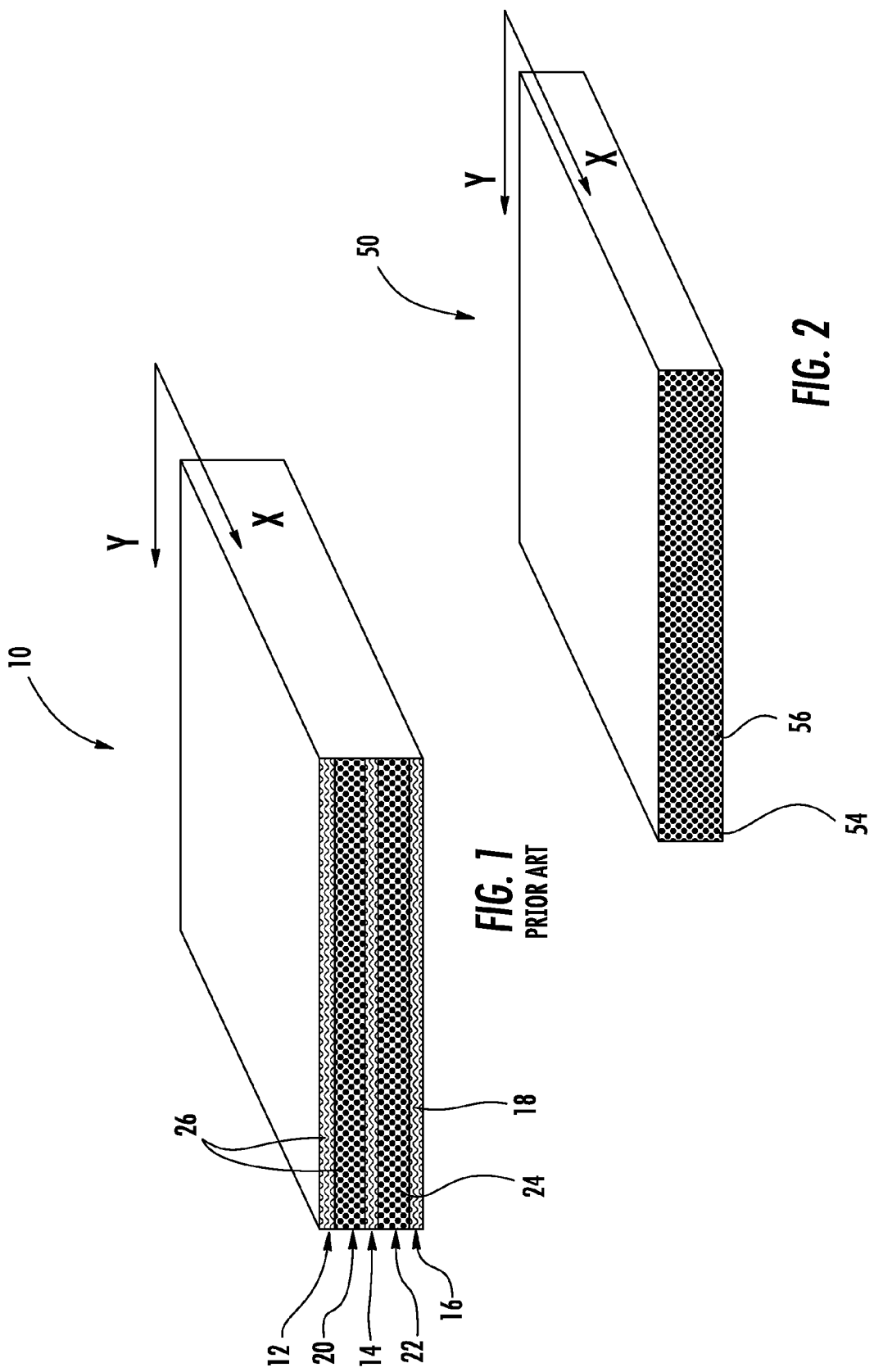

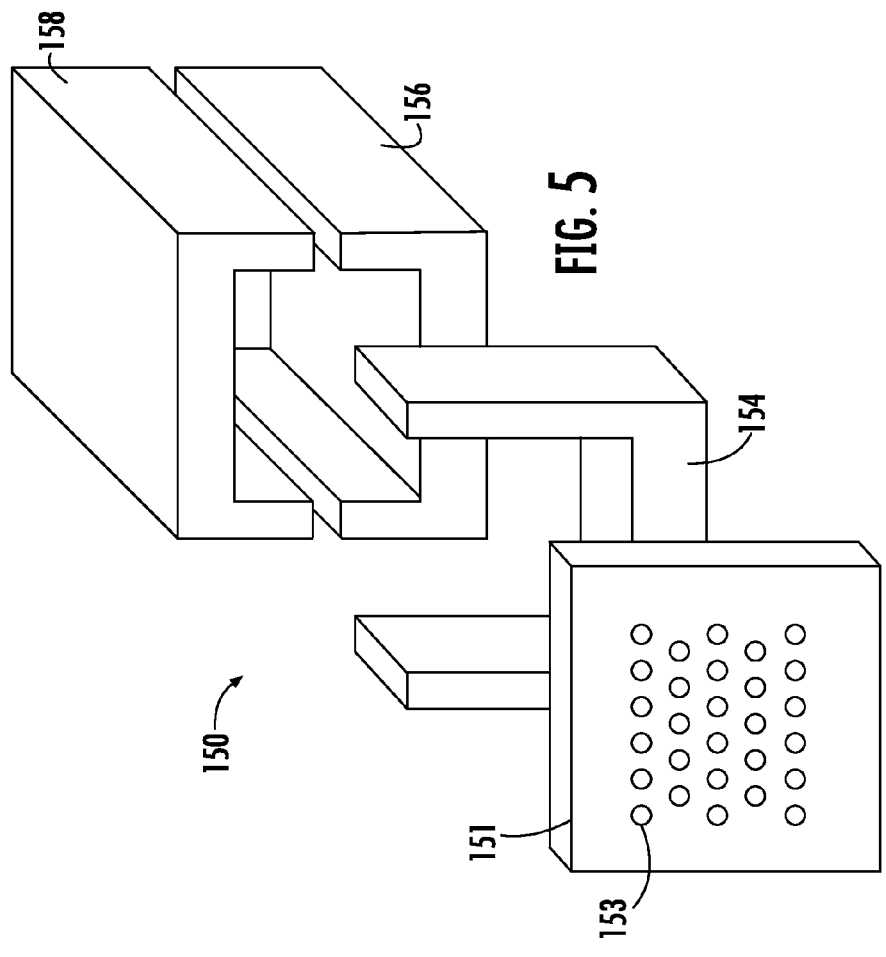
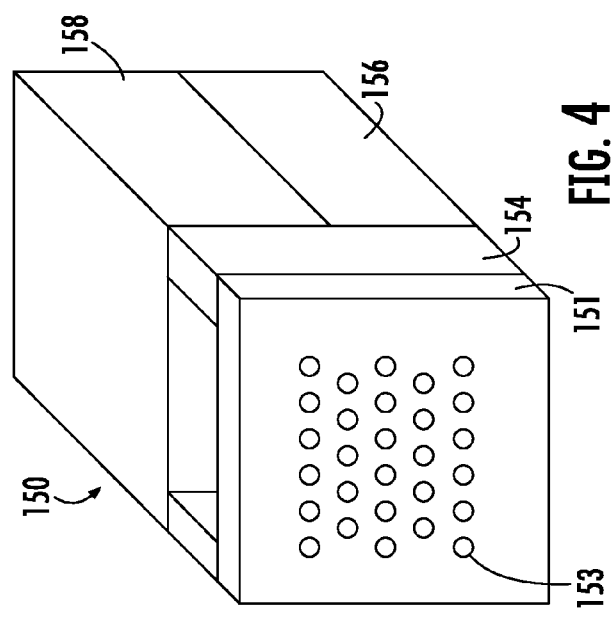

RESIN FOR COMPOSITE STRUCTURES

CROSS-REFERENCE TO RELATED APPLICATIONS

The present application is a Continuation of U.S. patent application Ser. No. 11/287,141, filed Nov. 23, 2005, the entire disclosure of which is incorporated herein by reference.

BACKGROUND

The present invention relates generally to methods and systems for producing fiber reinforced composite components using a pultrusion process. More specifically, the present invention relates to composite components that utilize a polyurethane resin matrix.

Fiber-reinforced composite structural components that are formed in a pultrusion process typically include a fibrous reinforcing material (e.g., glass, polymeric, or carbon fibers) embedded in a resin matrix (e.g., a polymer such as an unsaturated polyester or epoxy vinyl ester). The fibrous reinforcing material typically includes both yarns or tows (each of which include a large number of fibers or filaments) and one or more mats or webs of fibers.

To produce composite structural components such as lineals for use in windows and doors, the tows are coated by pulling them through an atmospheric pressure bath (typically an open vat or tub) of liquid resin precursor material. Once coated, the tows are pulled through a curing die to polymerize and set the resin. One difficulty with using atmospheric pressure baths to coat the tows is that the individual fibers or filaments within the tows may not be adequately coated with resin. For example, the outer surface of the tows may be coated with resin, while the filaments or fibers on the inside of the tows may be only partially coated.

Because the strength of the composite structural component is largely dependent upon the interaction between the resin matrix and the fibrous reinforcement, it is desirable to completely coat as many of the individual filaments or fibers as possible. Uncoated filaments are not structurally supported, and are unable to take any significant compressive load. In addition, void areas intermingled with the filaments become sites where cracks will initiate under load, thereby reducing both the stiffness and the strength of the composite component. Thus, it would be advantageous to reduce the number of partially coated filaments, voids, or the like that are present in the finished component.

Another difficulty associated with atmospheric pressure baths is that they generally contain a relatively large volume of uncured resin precursor chemicals, and a large surface area of these chemicals is exposed to the atmosphere. Vaporization of such chemicals into the surrounding atmosphere may be undesirable, and mitigation systems designed to reduce the vapor emissions may be relatively costly and may impede many of the tasks required to maintain product quality and productivity.

Conventional resins used in the production of pultruded composite components (e.g., polyesters, vinyl esters, phonolics, etc.) have an ultimate strength of between approximately 8,000 and 15,000 psi, and an elastic modulus between approximately 350,000 and 500,000 psi. This elastic modulus is well matched to that of the reinforcing fibers. When a compression or bending load is applied to such a composite component, the load is shared among the reinforcing fibers in a manner that results in relatively balanced loading and relatively high ultimate strength. However, the elongation-to-failure of these conventional resin systems is typically between approximately 1.5% and 3%, and is exceeded before that of the fibers, which may have an elongation-to-failure of 4% to 6%. The resin will fracture when its elongation-to-failure is exceeded, leaving the fibers unsupported. This allows the load to concentrate in a small percentage of the available fibers, exceeding their ultimate strength and resulting in the failure of the component at loads that are below the theoretical maximum of the complete fiber reinforcement package.

Conventional resins used in the production of pultruded composite components also have relatively little strength in the direction transverse to the longitudinal (i.e., pulling) direction. As a result, pultruded composite components may utilize reinforcing fibers oriented in the transverse orientation to provide the necessary transverse strength for the component. For example, the reinforcing material may include both fiber tows that extend through the pultruded component in the longitudinal direction and fiber mats that provide multidirectional strength for the component. However, the inclusion of transverse fibers or fiber mats undesirably adds weight and cost to the component and also adds processing difficulties to the production of the component.

Accordingly, there is a need to provide an improved resin system to provide enhanced structural strength for pultruded composite components as compared to that provided by conventional resin systems. There is also a need for a composite component that does not utilize transverse reinforcing fibers but that has sufficient transverse strength to provide resistance to bending and to allow the component to be secured with screws, nails, or the like. There is further a need to provide an improved system and method for coating reinforcing materials with a polymeric material in a pultrusion process.

SUMMARY

An exemplary embodiment of the invention relates to a resin precursor composition includes an isocyanate component, a first polyol having a molecular weight of between approximately 600 and 800 and an OH index of between approximately 200 and 300 mgOH/g, and a second polyol having a molecular weight of between approximately 100 and 300 and an OH index of between approximately 800 and 1,200 mgOH/g.

Another exemplary embodiment of the invention relates to a polyurethane resin precursor composition for use in a pultrusion process that includes an isocyanate material, a first polyether polyol having a molecular weight of between approximately 600 and 800 and an OH index of between approximately 200 and 300 mgOH/g, and a second polyether polyol having a molecular weight of between approximately 100 and 300 and an OH index of between approximately 800 and 1,200 mgOH/g. The polyurethane resin precursor composition also includes a mold release material and a filler material.

Another exemplary embodiment of the invention relates to a method for producing a resin precursor composition that includes mixing at least two polyether polyols with a mold release material and a filler material to form a first resin precursor component and mixing a second component with the first component to form a resin precursor composition, the second component comprising an isocyanate material. A first of the two polyether polyols has a molecular weight of between approximately 600 and 800 and an OH index of between approximately 200 and 300 mgOH/g and a second of the two polyether polyols has a molecular weight of between approximately 100 and 300 and an OH index of between approximately 800 and 1,200 mgOH/g.

Another exemplary embodiment of the invention relates to a resin precursor composition for use in the production of composite components that includes an isocyanate component comprising a material selected from the group consisting of diphenylmethane diisocyanate, a polymeric isomer of diphenylmethane diisocyanate, and combinations thereof. The resin precursor composition also includes at least one polyether polyol having a functionality of three in an amount such that the ratio of the isocyanate component to the at least one polyol is between approximately 80% and 115% of stoichiometric. The resin precursor composition also includes a mold release material and a filler material.

An exemplary embodiment of the invention relates to a polyurethane resin precursor composition for use in a pultrusion process that includes an isocyanate material comprising a material selected from the group consisting of diphenylmethane diisocyanate, a polymeric isomer of diphenylmethane diisocyanate, and combinations thereof. The polyurethane resin precursor also includes a first polyether polyol having a functionality of three and a molecular weight of between approximately 600 and 800, a second polyether polyol having a functionality of at least three and a molecular weight of between approximately 100 and 300, a mold release material, and a filler material.

An exemplary embodiment of the invention relates a method for producing a resin precursor composition that includes mixing at least one polyether polyol having a functionality of three with a mold release material and a filler material to form a first resin precursor component. The method also includes mixing a second component with the first component to form a resin precursor composition, the second component comprising an isocyanate comprising a material selected from the group consisting of diphenylmethane diisocyanate, a polymeric isomer of diphenylmethane diisocyanate, and combinations thereof. The step of mixing the second component with the first component is performed less than approximately five minutes before the resin precursor composition is to be provided to an impregnation die of a pultrusion process.

BRIEF DESCRIPTION OF THE DRAWINGS

FIG. 1 is a perspective view of a generic composite component produced in a prior art pultrusion process.

FIG. 2 is a perspective view of a generic composite component produced in a pultrusion process according to an exemplary embodiment that utilizes an improved resin to eliminate the need for transverse fiber reinforcement.

FIG. 4 is a perspective view of an impregnation die for use in producing a composite component according to an exemplary embodiment.

FIG. 5 is an exploded perspective view of the impregnation die illustrated in FIG. 4.

DETAILED DESCRIPTION

Figure 3:
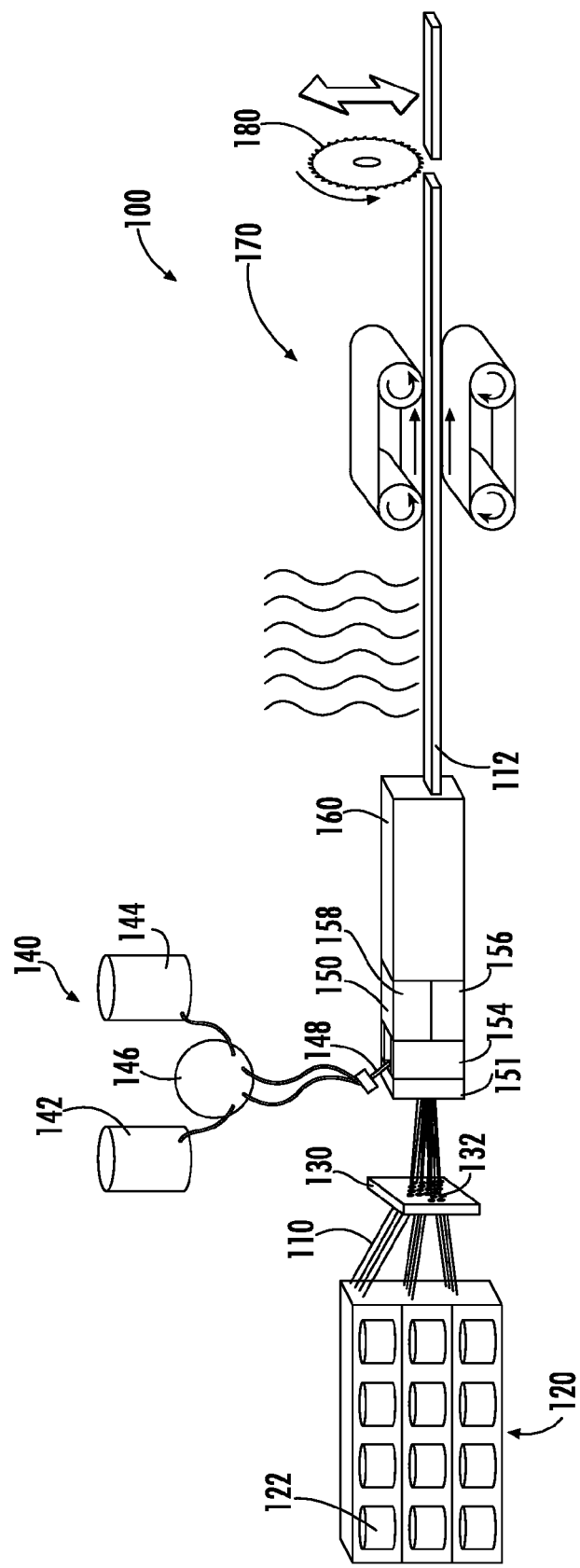
FIG. 3 is a schematic view illustrating components of a pultrusion line according to an exemplary embodiment.

According to an exemplary embodiment, a method and apparatus are provided for producing a pultruded composite component using an improved resin system. The composite components are provided in the form of lineals or other components for use in the production of windows, doors, and the like. According to other exemplary embodiments, any of a variety of other composite components may be produced using the resin, system, and methods described herein, including handles for brooms, shovels, and other hand tools; sheet pilings for erosion protection; frame members and door reinforcements for trucks and automobiles; structural elements for water cooling towers and RF-transparent structures such as cellular telephone towers; concrete reinforcing bars; highway delineators, guard railings, and posts; non-conductive and corrosion-resistant grating for oil drilling platforms and chemical plants; and any of a variety of other products.

The improved resin system is intended to provide the composite components with relatively high bending and compressive strength such that the components may be produced without the need to provide fiber reinforcement in the transverse direction (i.e., the direction perpendicular to the longitudinal or "pulling" direction). Such components may advantageously be produced at a lower weight, material cost, and capital cost as compared to conventional composite components using traditional resin systems. In contrast to conventional pultrusion processes that utilize transverse fibers (e.g., webs or mats of fibers incorporated in the component), the production speed of the composite components according to the exemplary embodiments described herein are not slowed by the addition of the transverse fibers, thereby requiring fewer machines to supply the desired quantity in a given time frame.

FIG. 1 illustrates a conventional generic pultruded composite component 10 that utilizes both fibers oriented in the longitudinal direction (shown as fibers 24 oriented in the "X" direction) and fibers oriented in the transverse direction (shown as fibers 18 oriented in the "Y" direction). The transverse fibers 18 may be provided, for example, as layers 12, 14, and 16, which include mats of fibers that are impregnated with a resin precursor 26. As shown in FIG. 1, layers 20 and 22 of longitudinally-oriented fibers (which also are impregnated with the resin precursor 26) are provided intermediate or between the mats 12, 14, and 16. Because the composite component 10 shown in FIG. 1 utilizes a conventional resin system (e.g., polyester, vinyl ester, or phenolic resins, etc.), the layers 12, 14, and 16 of fibers are necessary to provide transverse strength for the component 10.

FIG. 2 is a perspective view of a generic pultruded component 50 produced using a resin system that provides enhanced structural rigidity according to an exemplary embodiment. As illustrated in FIG. 2, the component 50 does not utilize fibers oriented in the transverse direction (i.e., the "Y" direction); instead, fibrous reinforcement is provided such that the fibers 54 are oriented only in a direction that is substantially parallel to the longitudinal direction (i.e., the "X" direction). The strength that was provided by the transverse fibers 18 in FIG. 1 is instead provided by a resin 56 having improved mechanical properties as compared to conventional resin systems. The component 50 may therefore be produced in a relatively simple manner that does not require the additional expense and difficulty associated with the use of transverse fibers.

According to an exemplary embodiment, composite components (e.g., such as component 50) are produced using a resin precursor that is substantially composed of a polyurethane material having improved mechanical characteristics in both the longitudinal and transverse directions as compared to components using conventional resin systems. Experimental data was compiled for a pultruded composite component made with a polyurethane resin system and a pultruded composite component made with a conventional unsaturated polyester resin system, both of which had the same glass reinforcement content. The longitudinal flexural strength of the component made with polyurethane resin was 230,000 psi, nearly three times the 80,000 psi longitudinal flexural strength for the comparable component made with a conventional polyester resin system. The longitudinal elongation to failure of the polyurethane component was 3.2 percent, compared to 1.8 percent for the conventional polyester component. Results were similar in the transverse direction. The pultruded component made with a polyurethane resin exhibited a transverse flexural strength of approximately 15,100 psi, more than three times that of the component made with an unsaturated polyester resin (4,800 psi). Transverse flexural elongation to failure was slightly higher as well: 1.4 percent for the polyurethane component as compared to 1.2 percent for the unsaturated polyester component.

The type of fibrous reinforcement utilized may differ according to various exemplary embodiments, and may depend on requirements for the particular application in which the composite component will be utilized. According to an exemplary embodiment, the longitudinal fibers may be provided as glass fibers. According to other exemplary embodiments, the fibers may be polymeric fibers, carbon fibers, or any other suitable fibers that may be utilized in the production of pultruded products.

It should be noted that while FIG. 2 illustrates a component 50 having a generally rectangular solid shape, components utilizing the resin system and produced by the method described herein with reference to the various exemplary embodiments may be provided in any number of sizes, shapes, and configurations. Features may be provided in the components that enable their use in various applications, including use in lineals and other structural components for windows, doors, and the like. Additionally, pultruded components may be produced using the resin formulations described herein that have fibrous reinforcement oriented both in the longitudinal direction and in one or more other directions that are not substantially parallel to the longitudinal direction (including fibers that may be oriented in the transverse direction).

According to an exemplary embodiment, the polyurethane resin precursor system includes an isocyanate, a polyol or polyol blend, and a system of lubricants and other additives that are typically referred to as a "mold release." The resin system may also optionally include one or more polymeric additives that may be used to modify the surface of the resulting component, to modify the physical properties of the component, to provide improved processing, or to provide other benefits. Additionally, the resin system may include one or more fillers which may act passively to reduce the cost of the overall resin system (e.g., by taking the place of more costly constituents) or may actively function to provide improved physical properties or improved processing.

The ratio of the isocyanate component to the polyol component is weighted according to the fraction of the components that are reactive. According to an exemplary embodiment, the ratio of isocyanate to polyol is between approximately 80% and 115% of stoichiometric. According to another particular exemplary embodiment, the ratio of isocyanate to polyol is between approximately 90% and 110% of stoichiometric. According to a particular exemplary embodiment, the ratio of isocyanate to polyol is between approximately 95% and 105% of stoichiometric.

The mold release component of the resin precursor system is provided in an amount sufficient to prevent adhesion of the resin precursor system to the die surface, thereby giving the part a relatively smooth surface and reducing the force required to move the part through the curing die. The mold release includes an acid component that is attracted to the metallic surface of the die (due to its highly polar nature) and forms a lubricating layer. The acid component is soluble in the polyol mixture; but as the polyol is consumed, it precipitates out of solution and is driven towards the surface of the gelling mass. These two forces concentrate the acid component of the mold release at the surface, improving its release performance compared to a substance that might have the same lubricity but no tendency to concentrate at the surface. Trade names of suitable mold release systems include Pul-24, commercially available from Axel Plastics, and CR-250, commercially available from Technick Products.

According to an exemplary embodiment, the mold release component is provided at a level of between approximately 0.5% and 5% of the total mass of the resin. According to a preferred embodiment, the mold release component is provided at a level of between approximately 0.5% and 3% of the resin. According to a particularly preferred embodiment, the mold release component is provided at a level of between approximately 0.5% and 2.5% of the resin.

The polymeric additive is provided in an amount sufficient to improve the surface quality of the finished part by reducing the shrinkage of the resin as it cures so that the surface of the curing resin remains in contact with the polished die surface and retains the smooth characteristic of the die surface. According to an exemplary embodiment, the polymeric additive is provided at a level of between approximately 0% and 25% of the total mass of the resin. According to a preferred embodiment, the polymeric additive is provided at a level of between approximately 2% and 15% of the total mass of the resin. According to a particularly preferred embodiment, the polymeric additive is provided at a level of between approximately 4% and 10% of the total mass of the resin.

The filler component of the resin precursor system is provided in an amount sufficient to increase the viscosity (and thereby the shear force) of the resin layer between the outermost glass fibers and the die surface, and to react with the acidic elements of the mold release to provide a significant body of lubricative particles between the outermost glass fibers and the die surface. The filler component may include a solid such as kaolin clay or calcium carbonate. The calcium carbonate may either be untreated or may be treated with a stearic or oleaic acid to modify its surface.

According to an exemplary embodiment, the filler component may be provided at a level of between approximately 0.5% and 20% of the total mass of the resin. According to a preferred embodiment, the filler component may be provided at a level that is substantially equal to the mass percentage of the mold release component.

The isocyanate component can be any one of several low to intermediate grades of diphenylmethane diisocyanate (MDI), its polymeric isomers (pMDI), and blends thereof. The isocyanate component has an NCO (nitrogen-carbon-oxygen) or cyanate percentage of between approximately 25% and 32%, preferably between approximately 27% and 31.5%, and most preferably between approximately 31.2% and 31.5%. The viscosity of the isocyanate component is between approximately 100 and 500 centipoise (cps), preferably between approximately 100 cps and 250 cps, and most preferably approximately 200 cps.

Trade names of products that may be used as isocyanate components according to various exemplary embodiments include Mondur 448, Mondur 486, Mondur MR and Mondur MR (Light), which are commercially available from Bayer MaterialScience; Lupranate M20S and Lupranate M20SB, which are commercially available from BASF; Isobind 1088 and Papi 27, which are commercially available from Dow Chemical Company; and Rubinate M, which is commercially available from Huntsman Polyurethanes.

The polyol component of the resin precursor system may consist of a single polyol or may be provided as a blend of two or more polyols.

According to an exemplary embodiment, the polyol component is provided as a single polyol having the following characteristics: (a) the polyol has a functionality of three, preferably with all of the hydroxyl groups being primary hydroxyls (i.e., readily available to react); (b) the polyol is a polyester or polyether polyol, preferably a polyether polyol; (c) the polyol has an OH index between approximately 500 and 700 mgOH/g, preferably between approximately 600 and 700 mgOH/g, and most preferably between approximately 675 and 700 mgOH/g; (d) the polyol has a molecular weight between approximately 200 and 300, preferably between approximately 225 and 275, and most preferably approximately between 240 and 250; and (e) the polyol has a viscosity below approximately 1000 cps and preferably below 900 cps. Trade names of suitable polyols include Voranol 230-660, which is commercially available from Dow Chemical Company and Multranol 9138, which is commercially available from Bayer MaterialScience.

According to another exemplary embodiment, the polyol component is provided as a blend of two polyols.

The first polyol in the two-polyol blend has the following characteristics: (a) the polyol has a functionality of three, preferably with all of the hydroxyl groups being primary hydroxyls; (b) the polyol is a polyester or polyether polyol, preferably a polyether polyol; (c) the polyol has an OH index between approximately 200 and 300 mgOH/g, preferably between approximately 230 and 250 mgOH/g, and most preferably between approximately 235 and 240 mgOH/g; (d) the polyol has a molecular weight between approximately 600 and 800, preferably between approximately 650 and 750, and most preferably between approximately 680 and 720; and (e) the polyol has a viscosity below approximately 500 cps, preferably below approximately 400 cps, and most preferably between approximately 240 and 270 cps. Trade names of suitable polyols for use as the first polyol include CAPA 3091, commercially available from Solvay; Carpol GP725, commercially available from Carpenter; Pluracol TP740, commercially available from BASF; and Voranol 230-238, P425 and Castor Oil, commercially available from Dow Chemical Company.

The second polyol in the two-polyol blend has the following characteristics: (a) the polyol has a functionality of three, preferably with all of the hydroxyl groups being primary hydroxyls; (b) the polyol is a polyester or polyether polyol, preferably a polyether polyol; (c) the polyol has an OH index between approximately 800 and 1200 mgOH/g, preferably between approximately 900 and 1100 mgOH/g, and most preferably between approximately 935 and 1,050 mgOH/g; (d) the polyol has a molecular weight between approximately 100 and 300, preferably between approximately 125 and 200, and most preferably between approximately 150 and 190; and (e) the polyol has a viscosity below approximately 2,000 cps, preferably below approximately 1,500 cps. Trade names of suitable polyols for use as the second polyol include Pluracol 858, commercially available from BASF, and Multranol 9133, commercially available from Bayer MaterialScience.

The ratio of the first polyol to the second polyol is such that the OH index of the blend is between approximately 350 and 700 mgOH/g, preferably between approximately 550 and 650 mgOH/g, and most preferably between approximately 575 and 625 mgOH/g.

According to another exemplary embodiment, the polyol component is provided as a blend of three polyols.

The first polyol in the three-polyol blend is provided at a level between approximately 20 and 50% of the blend, preferably between approximately 25 and 35 percent, and most preferably approximately 30%, and has the following characteristics: (a) the polyol has a functionality of three, preferably with all of the hydroxyl groups being primary hydroxyls; (b) the polyol is a polyester or polyether polyol, preferably a polyether polyol; (c) the polyol has an OH index between approximately 200 and 300 mgOH/g, preferably between approximately 230 and 250 mgOH/g, and most preferably between approximately 235 and 240 mgOH/g; (d) the polyol has a molecular weight between approximately 600 and 800, preferably between approximately 650 and 750, and most preferably between approximately 680 and 720; and (e) the polyol has a viscosity below approximately 500 cps, preferably below approximately 400 cps, and most preferably between approximately 240 to 270 cps. Trade names of suitable polyols for use as the first polyol include CAPA 3091, commercially available from Solvay; Carpol GP725, commercially available from Carpenter; Pluracol TP740, commercially available from BASF; and Voranol 230-238, P425 and Castor Oil, commercially available from Dow.

The second polyol in the three-polyol blend is provided at a level between approximately 20 and 40% of the blend, preferably between approximately 25 and 35% and most preferably approximately 30%, and has the following characteristics: (a) the polyol has a functionality of three, preferably with all of the hydroxyl groups being primary hydroxyls; (b) the polyol is a polyester or polyether polyol, preferably a polyether polyol; (c) the polyol has a OH index between approximately 500 and 700 mgOH/g, preferably between approximately 600 and 700 mgOH/g, and most preferably between approximately 675 and 700 mgOH/g; (d) the polyol has a molecular weight between approximately 200 and 300, preferably between approximately 225 and 275, and most preferably between approximately 240 and 250; and (e) the polyol has a viscosity below approximately 1000 cps, preferably below approximately 900 cps. Trade names of suitable polyols for use as the second polyol include Pluracol TP440, commercially available from BASF; Voranol 230-238, commercially available from Dow Chemical Company; and Multranol 9138, commercially available from Bayer MaterialScience.

The third polyol in the three-polyol blend is provided at a level between approximately 20 and 50% of the blend, preferably between approximately 30 and 45 percent, and most preferably approximately 40%, and having the following characteristics: (a) the polyol has a functionality of three, preferably with all of the hydroxyl groups being primary hydroxyls; (b) the polyol is a polyester or polyether polyol, preferably a polyether polyol; (c) the polyol has an OH index between approximately 800 and 1200 mgOH/g, preferably between approximately 900 and 1100 mgOH/g, and most preferably between approximately 935 and 1050 mgOH/g; (d) the polyol has a molecular weight between approximately 100 and 300, preferably between approximately 125 and 200, and most preferably between approximately 150 and 190; and (e) the polyol has a viscosity below approximately 2,000 cps, preferably below approximately 1,500 cps. Trade names of suitable polyols for use as the third polyol include Pluracol 858, commercially available from BASF and Multranol 9133, commercially available from Bayer MaterialScience.

The percentages of the first, second and third polyols in the three-polyol blend are such that the OH index of the blend is between approximately 350 and 750 mgOH/g, preferably between approximately 625 and 725 mgOH/g, and most preferably between approximately 650 and 700 mgOH/g.

The polymeric additive, if included, performs only physical functions within the system. Depending on the system requirements, it may enhance mechanical or thermal properties or may improve the surface of the part by counteracting the common tendency of thermosetting polymers to shrink slightly when they polymerize. According to an exemplary embodiment, the polymeric additive performs only this shrink-reduction function, and may be referred to as a "low-profile additive." This function derives from the coefficient of thermal expansion of the additive, which causes it to increase in volume at an appropriate time during the polymerization of the thermoset polymer system. Examples of acceptable low-profile additives include polystyrene, styrene-acrylic copolymer, methacrylate resin, polyvinyl acetate, and capped PPO.

To prepare the resin, it is generally preferred that all of the components except the isocyanate component are blended together in advance of use. Because the isocyanate component is highly reactive, it is generally kept separate from the other components until just before use. According to an exemplary embodiment, the isocyanate component is added to the polyol-additive mixture less than five minutes before use in a pultrusion process. According to a particular exemplary embodiment, the isocyanate component is added to the polyol-additive mixture less than one minute before use. The isocyanate component and the polyol-additive mixture are mixed together using a continuous metering-mixing system according to an exemplary embodiment. According to another exemplary embodiment, the isocyanate component is premixed with one or more additives.

As the isocyanate component and the polyol-additive mixture enter a curing die of a pultrusion system, they may be in an immiscible liquid state. According to a particular exemplary embodiment, the isocyanate component and the polyol-additive mixture are immiscible, and the heat of the curing die accelerates the immiscible liquids toward solution. They then begin reacting. As the reaction progresses, the isocyanate and polyol initially form a partially-reacted, highly-adhesive gel substance. This gel substance exists for a relatively short time, because of the nature of the isocyanate-polyol reaction. This reaction is an addition reaction; therefore, molecular weight builds slowly at first but becomes asymptotic and very high near completion. The result is that the reactive mixture remains a liquid until the reaction is more than 50 percent complete, then moves into the highly-adhesive gelled state quickly and for only a very short time compared to other resin systems employed in pultrusion.

In addition, a portion of the acid reacts with the calcium carbonate filler, forming a metal soap, which also migrates to the metal surface of the die to enhance the lubricity of the metal surface. This reaction may be supplemented by pretreatment of the calcium carbonate prior to mixing of the system, which increases the stability of the system and increases the amount of time the mixture can be stored without loss of performance.

As the isocyanate and polyol react, their density increases slightly (e.g., between approximately 0.5% and 1.0%), resulting in a commensurate decrease in volume. Simultaneously, the temperature of the polymeric additive increases due to the heating of the die and the exothermic heat of reaction of the isocyanate and polyol, resulting in an increase in its volume.

The resin precursor systems disclosed herein have elastic moduli after curing of between approximately 350,000 and 500,000 psi, and preferably between 450,000 and 500,000 psi. In contrast to conventional resin systems (e.g., unsaturated polyesters or epoxy vinyl esters), the elongation-to-failure of the resin systems disclosed herein after curing are between approximately 6% and 15% and preferably between 7.5% and 10%. The increased elongation-to-failure of the resin systems allows for the production of pultruded composite components in which the resin continues to support reinforcing fibers under load and to cause the load to be shared among a larger group of fibers as the applied load is increased. Since the elongation-to-failure of the resin exceeds the elongation-to-failure of all commonly used fibers (including carbon, polymeric, and glass fibers) and the modulus of the resin system is sufficient to distribute load effectively, it can be expected that the failure mode of a pultruded structural shape under bending, compressive, tensile or torsional load will occur in the fibers (as opposed to occurring in the resin). This can result in an increase in the ultimate strength of a structure by a factor of two or three when compared to the ultimate strength of the same component made with the same fiber content but with a conventional resin system such as polyester, vinyl ester or phenolic resins. In the case of these resins, it is common for the failure mode to be the failure of the resin in shear, which results in the buckling of unsupported fibers at loads far below the theoretical load-carrying capacity of the fiber.

The ultimate strength advantage of the high-strength resin system also provides benefits in the direction transverse to the primary load path and orientation of the primary fiber reinforcement. Because of the ultimate strength limits of the conventional resins, structures made with them have very little transverse strength, unless reinforcing fibers with a transverse orientation are included. However, the inclusion of transverse fibers in a pultruded component adds both weight and cost to the structure. If a high-strength resin system is substituted, the transverse strength is increased. In most cases, no transverse reinforcement is required at all.

An additional advantageous feature of utilizing such an improved resin system is that the structural characteristics of the pultruded component are such that it can accept fasteners intended for drywall or sheet metal without splitting, so that simple mechanical attachment methods can be used in assembly and installation of the component. For example, fasteners such as screws, nails, or the like may be used to secure pultruded lineals used in the production of windows and doors without the risk of having the lineals split at the location of the fasteners.

The rheology and cure kinetics of the resin precursor system according to the exemplary embodiments described herein are such that it can be run at speeds comparable to or faster than conventional resin systems. The elimination of transverse reinforcing fibers may also provide improved processing speeds for the production of the pultruded components. For example, while a conventional pultrusion process may operate at a speed of between approximately 3 and 5 feet per minute, a pultrusion process that does not utilize transverse reinforcing fibers may operate at a speed of between approximately 4 and 10 feet per minute.

EXAMPLE 1

According to a theoretical exemplary embodiment, a resin precursor system is prepared that includes 169 parts by weight of an isocyanate component, a two-component blend of polyols that includes 30.3 parts by weight of a first polyol component and 60.6 parts by weight of a second polyol component, 4.2 parts by weight of a mold release, and 4.2 parts by weight of a filler. The isocyanate component comprises BASF Lupranate M20S, the first polyol comprises Carpenter Carpol GP725, the second polyol comprises Bayer Multranol 9133, the mold release comprises Technick Products CR-250, and the filler comprises Huber calcium carbonate.

EXAMPLE 2

According to another theoretical exemplary embodiment, a resin precursor system is prepared that includes 175 parts by weight of an isocyanate component; a three-component blend of polyols that includes 27.5 parts by weight of a first polyol component, 27.5 parts by weight of a second polyol component, 36.6 parts by weight of a third polyol component; 4.2 parts by weight of a mold release, and 4.2 parts by weight of a filler. The isocyanate component comprises Bayer Mondur 486, the first polyol comprises Solvay CAPA 3091, the second polyol comprises Dow Voranol 230-660, the third polyol comprises BASF Pluracol 858, the mold release comprises comprises Axel Plastics Pul-24, and the filler comprises Huber coated calcium carbonate.

Figure 7:
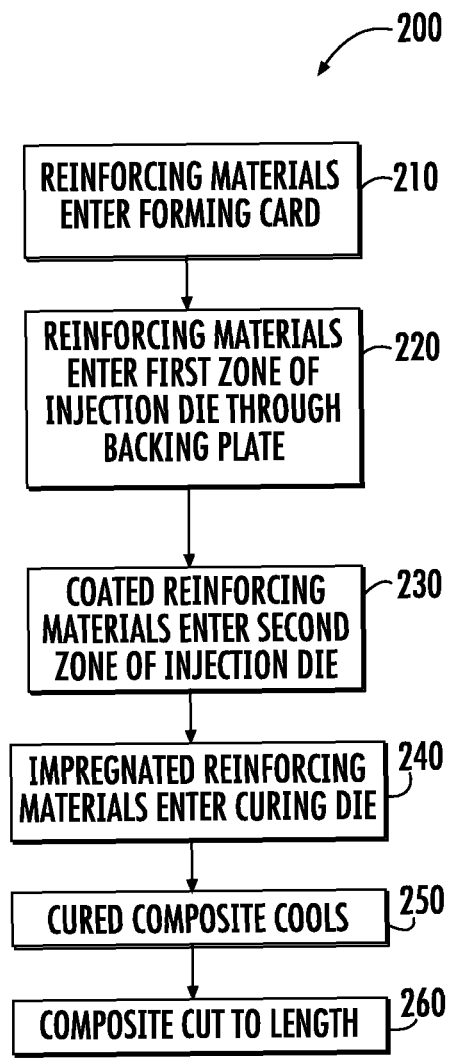
FIG. 7 is a flow diagram illustrating steps in a method of producing a composite component according to an exemplary embodiment.

FIG. 3 is a schematic illustration of a system 100 for producing a composite component using a pultrusion process according to an exemplary embodiment. The manner in which the system 100 operates will be described with reference to FIG. 7, which is a flow diagram illustrating steps in the process or method 200 of producing composite components according to an exemplary embodiment.

Reinforcing materials in the form of fiber yarns or tows 110 are provided on spools 122 that are arranged on a fixture such as a creel 120. The spools 122 are arranged in a manner that allows each tow 110 to be fed to the next step in the process without interference or tangling with other tows or with the creel 120. In the case of glass fiber tows supplied in 40 pound "doffs," the doffs are arranged standing on end. The creel 120 acts to provide an array of doffs vertically and horizontally such that the tows 110 are fed from the inside of the doff. In the case of carbon, polymeric, or other high-strength fibers, each spool 122 is mounted on a spindle which may incorporate adjustable resistance to rotation. The spindles are arranged vertically and horizontally so that they do not interfere or tangle.

Features (not shown) are provided for feeding each tow 110 through the creel 120 to avoid interference. According to an exemplary embodiment, each tow passes through a series of holes in the creel structure. These holes may or may not be finished, or may incorporate inserts made of a material that reduces friction and prevents fraying of the fiber. The holes are arranged within the structure in such a way that the fibers do not cross or contact each other. The tows are presented at the exit end of the creel in an array that makes the location of problems or missing tows obvious to the operator, and facilitates alignment of the tows as they enter the next step in the process. According to an exemplary embodiment, such features are of sufficient size to allow the passage of fiber splices, which will be made when a spool of fiber runs out and needs to be replaced without halting production.

In a step 210 (FIG. 7), each tow 110 is fed through an aperture or hole 132 in a member or element shown as a supporting fixture 130 (e.g., a forming card). The supporting fixture 130 includes a plurality of apertures 132 through which the tows 110 may be routed in a pattern consistent with the final design shape of the product to be manufactured. According to an exemplary embodiment, the supporting fixture 130 is provided as a sheet of plastic (e.g., polyethylene, nylon, etc.) having a thickness of approximately 0.5 inches. The apertures 132 have diameters of between approximately 0.25 and 0.5 inches and are provided in an array with a distance between adjacent apertures of between approximately 0.5 and 1.0 inches. One function of the supporting fixture 130 is to provide the tows in a desired shape directly to a backing plate of an impregnation die without sagging or crossing.

According to an exemplary embodiment, a system 140 is provided to meter and feed a high-strength, two-part polymeric resin precursor (e.g., a thermosetting polyurethane-based resin precursor as described above) utilizing two containers 142 and 144 and a metering device 146. One of the containers (e.g., container 142) contains one of the reactive chemicals used to form the resin precursor and a variety of processing aids; the other container (e.g., container 144) contains a second reactive chemical without any processing aids. The chemicals from the two containers are kept separate until just before they are to be introduced into an impregnation die of a pultrusion system, when they are simultaneously pumped and mixed a predetermined amount of time before they are to be introduced into the die.

It should be appreciated that the particular ratio of the constituents contained in the containers 142 and 144 may vary depending on the particular constituents utilized. The chemicals provided in each of the containers may vary according to other exemplary embodiments. For example, each of the containers may include both reactive chemicals and processing aids. According to still other exemplary embodiments, a different number of containers may be provided (e.g., three containers may each contain a reactive chemical or two of the three containers may include reactive chemicals and the third container may include processing aids, pigments, UV stabilizers, etc.).

The components of the resin precursor are dispensed at the desired ratio by means of the metering device 146 (e.g., a metering pump system). To provide improved efficiency in the production of composite components, the chemicals in the two containers 142, 144 are provided in a manner that results in the full consumption of the reactive chemicals during production of the composite components (i.e., the flow rate of the chemicals into an impregnation die matches the rate at which the chemicals are mixed). In this manner, the production of waste material is reduced as compared to conventional pultrusion processes.

In the preferred embodiment, the pumping system provides for adjustment of the ratio of the components, and runs at a speed that is matched to the consumption of materials, and the components are mixed by means of a disposable static mixer 148. The mixing system may run at a continuous speed matched to the rate of material consumption (i.e., the mixing of chemicals may proceed at a rate that is substantially identical to the rate of fluid flow into the impregnation die), or may operate intermittently to maintain a fluid level between minimum and maximum levels in the subsequent step in the process.

According to an exemplary embodiment, the components are mixed less than five minutes before the resin precursor is provided to the first chamber of the impregnation die. According to another exemplary embodiment, the components are mixed less than one minute before the resin precursor is provided to the first chamber of the impregnation die. One advantage of such a method is that the resin precursor is produced on demand during the production process, eliminating the need to store excess resin precursor or to mix it beforehand.

Figure 6:
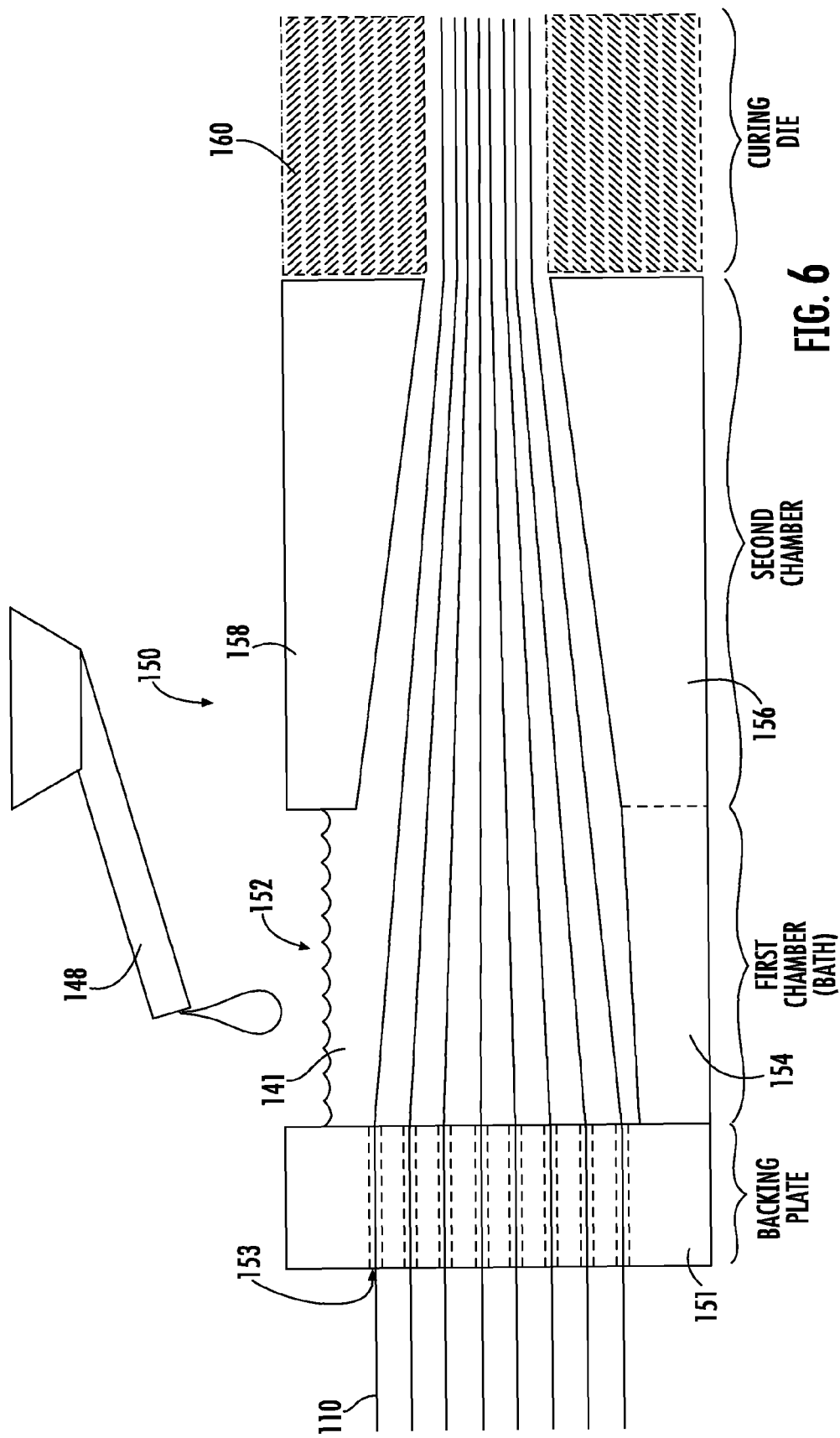
FIG. 6 is a cross-sectional view of the impregnation die illustrated in FIG. 4.

The fiber tows 110 and mixed resin precursor 141 (FIG. 6) are each introduced into a device shown as an impregnation die 150 that is configured to coat individual filaments within each fiber tow thoroughly with the resin, and to deliver an intimately-mixed resin-fiber mass with the proper ratio of resin precursor and fiber in the proper geometry to the entrance of a curing die. The device 150 includes a backing plate 151 having a plurality of apertures or holes 153 provided therein and a first chamber or zone 154 and a second chamber or zone 156 for wetting the tows 110 with the resin system, as illustrated in FIGS. 4-6. The tows 110 are first introduced into the first chamber 154 in a step 220 (FIG. 7), followed by their introduction into the second chamber 156 in a step 230. The device 150 and the method of coating the fibers and yarns will be described in greater detail below.

Previously, the wetting of reinforcement materials was viewed as a single step operation. To provide more complete wetting of the tows 110 (and the individual fibers within the tows) as compared to conventional pultrusion processes, the impregnation die 150 separates the process of wetting the fiber into two distinct steps which are governed by the same physical laws, but in different ranges and on different scales.

The process of wetting is so divided because the dynamics of the wetting processes are sufficiently different that different flow conditions must be maintained to maximize the efficiency of each step, and the flow conditions required for one step are not necessarily the same as or similar to the conditions required for the other. Both wetting steps are governed generally by two principles of physics. First, the flow of fluids through porous media (e.g., wetting of the tows) is described generally by Darcy's Law. Second, capillary action (e.g., wetting of individual filaments or fibers) is described generally by Washburn's Equation.

Darcy's Law describes the flow of a liquid system through a porous medium. Darcy's Law can be expressed in the equation $$Q = AK\frac{\Delta h}{L}$$

where Q is the volumetric flow rate, A is the flow area perpendicular to L, K is the hydraulic conductivity, and $\Delta h/L$ is the change in hydraulic head over the path length. Although Darcy's Law can be said to take capillary action into account via the K (hydraulic conductivity) term, in practical terms different values must be used as the scale changes and the relative importance of the forces involved changes, making it less effective at describing the entire wetting process.

Washburn's Equation describes the capillary flow of a fluid in a porous medium, and takes into account the intermolecular forces between the fluid and the porous medium. It can be expressed in the following equation:

$$L^2 = \frac{\gamma D t}{4\eta}$$

where t is the time for a liquid of viscosity $\eta$ and surface tension $\gamma$ to penetrate a distance L into a fully wettable, porous material whose average pore diameter is D.

The scale of the first-step process—the wetting of the exterior of the fiber tows—is in a range where Darcy's Law is dominant and capillary action has little if any influence. However, the scale of the second step process—the wetting of the individual filaments within each tow—is in a range where capillary action can become the most significant, or even the dominant, wetting mechanism.

The first step in the wetting operation is the process of wetting the exterior of the fiber yarns or tows with the liquid resin precursor (e.g., step 220). The first chamber 154 is provided as a "bath" provided at atmospheric pressure, and the tows 110 enter the bath separated by a sufficient distance to allow the liquid resin precursor 141 to flow freely around the tows 110. To separate the tows 110 from each other, the tows enter the first chamber 154 through the backing plate 151, which includes an aperture 153 for each of the tows 110. The apertures 153 are spaced from each other such that the distance between the tows is sufficient to allow the resin precursor 141 to flow through the mass of fibers without impediment, and so that the resin precursor 141 is provided in the first chamber without voids. The diameter of each aperture 153 is larger than the diameter of the tows 110 to accommodate relatively simple threading of the tows through the aperture and to allow the passage of splices when one spool of fiber runs out and is replaced by another. The thickness of the plate is great compared to the tow diameter (in the range of 1 inch or greater). The resin precursor is prevented from running out of the first chamber 154 by the counter-flow motion of the tows 110 through the apertures.

According to an exemplary embodiment, the bath is provided at atmospheric pressure. The liquid level in the bath is kept high enough so that all fiber yarns or tows are covered with liquid for a sufficient time to allow the resin precursor 141 to flow over and around all tows. As liquid exits the bath and enters the second chamber 156 (FIG. 4) with the moving fiber mass, the level of the resin precursor 141 in the bath is maintained by adding resin precursor 141 into the first chamber 154 from a continuous or intermittent pumping/metering/mixing system (e.g., system 140).

Because the bath is provided at atmospheric pressure in first chamber 154 and the tows 110 are separated from each other by an appropriate distance, the exterior surfaces of the tows 110 are thoroughly wetted by the force of gravity without impediment, so that the resin precursor fills the entire chamber without voids. After initial wetting, the resin-fibrous mass includes a significant excess of resin precursor (many times the amount of resin precursor that will eventually become the final part). The length of time required to wet the exterior of each tow 110 is primarily dependent on the viscosity of the resin, but also possibly to a small degree by the interfacial surface tension relationship between the resin precursor and the fiber.

The second step of the process (e.g., step 230) is the penetration of the liquid resin precursor system into the interstitial spaces within the individual tows, among and around each fiber or filament. The wetted tows 110 enter the second chamber 156, which has a configuration that is intended to cause the liquid resin precursor to penetrate into the individual tows 110 by creating the conditions necessary to cause the liquid resin precursor to penetrate into interstitial spaces between the individual fibers in each tow 110.

According to an exemplary embodiment, the second chamber 156 includes a tapered or decreasing cross-sectional area from its entrance to its exit. The cross-sectional area and shape of the exit end of the second chamber 156 is configured to approximate that of the entrance to the curing die 160 and that of the final part. The degree of taper (the ratio of entrance area to exit area) of the second chamber 156 may vary based on a variety of factors. Such factors may include, for example, the viscosity of the resin precursor system, the interfacial surface tension of the resin precursor system with the fiber reinforcement, and the start-up speed and targeted production speed of the product(s) being manufactured, among others.

While the individual tows have diameters of approximately one millimeter or less, the individual filaments or fibers are much smaller, having diameters of approximately 30 microns or less. At such a size, capillary action becomes a significant mechanism, even the dominant mechanism, influencing the speed and degree of wetting. Factors that may influence capillary flow into the tow include the following:

1. The pore size (i.e., the size and shape of the passage into the tow). Resin precursor flow into the interstitial spaces inside a tow takes place laterally, perpendicular to the main axis of the tow. The shape of the passage is rectangular, with the dimension along the axis of the tow effectively infinite and the dimension perpendicular to the fiber equal to the nominal filament spacing within the tow.
2. The distance the resin precursor must travel. In the case of the essentially cylindrical shape of a fiber tow, this distance is equal to the radius of the fiber tow, since resin precursor is flowing to the center of the tow from the entire perimeter.
3. The viscosity of the resin precursor system. Higher viscosity decreases the speed of capillary action.
4. The interfacial surface tension between the resin precursor system and the fiber. It is a measure of the attraction of the resin precursor system to the fiber at an atomic level. Higher interfacial surface tension indicates greater attraction of resin precursor to fiber, and speeds capillary action.

If capillary action is slow due to low interfacial surface tension or high viscosity, the same Darcy's law factors that govern the wetting of the tow exteriors may be applied to model and influence wetting. In that case, the speed of flow is directly proportional to pressure, and pressure can be increased by constructing the impregnation die with a second chamber tapered at a rate such that pressure build-up occurs. The pressure buildup will be governed by the taper ratio, the viscosity of the resin precursor and the velocity of the fiber moving through the chamber.

According to an exemplary embodiment, the resin precursor 141 has a viscosity below approximately 2,000, and more desirably below approximately 1,000. The interfacial surface tension between the liquid and the fiber is greater than approximately 0.02 N/m and more desirably above 0.05 N/m. At these values, the first wetting step will require less than approximately three seconds to complete, and the second step will require less than approximately ten seconds. At a tow velocity of approximately 60 inches per minute, the length of the first and second chambers can be as short as approximately fifteen inches, and the required taper of the second chamber needs only to be sufficient to replace the air that escapes out of the tows through the entrance of the device.

In a step 240 (FIG. 7), the wetted, formed resin-fiber mass enters a curing die 160. Heat is applied to the resin-fiber mass by means of heat applied to the curing die 160. The heating apparatus may be arranged so as to provide different amounts of heat and different temperatures between the entrance and exit of the die, depending on the rheology of the resin precursor system used. According to an exemplary embodiment in which a polyurethane-based resin precursor is utilized, the curing die 160 is heated to a temperature of between approximately 50 and 320 degrees Celsius.

According to an exemplary embodiment, the curing die 160 is constructed of any suitable metal such as tool steel, aluminum, or another metal. The curing die 160 may be coated with a wear resistant coating to reduce erosion by the resin-fiber mass as it passes through the die. The entrance of the curing die 160 may be configured such that there is an entrance taper, to provide added compression pressure to the resin-fiber mass and insure impregnation of the resin. The exit of the curing die 160 may be configured such that there is an exit taper to allow for thermal expansion, as required to minimize the friction and thereby the pulling force required.

According to an exemplary embodiment, the curing die 160 is heated with electric resistance heaters in three heat zones arrayed above and below the die (not shown), with supplemental heating provided by individual resistance heaters applied externally to the sides of the die or inserted into chambers drilled into the die specifically for the insertion of heaters. A cooling system (e.g., a chilled water system) is provided at the entrance and exit of the die. The cooling system is intended to prevent premature curing of the resin precursor in the wetting device and to reduce the temperature of the part below its glass transition temperature as it exits the die.

According to an exemplary embodiment, the resin-fiber mass travels through the curing die at a speed of between approximately 1 and 20 feet per minute. The curing die has a length of between approximately 2 and 4 feet according to an exemplary embodiment. It should be appreciated that the speed of travel of the resin-fiber mass, the length of the curing die, and other parameters (e.g., temperature of the curing die, etc.) may vary according to other exemplary embodiments, and may depend on the type of resin precursor system and reinforcement material utilized, the desired rate of production, and the like.

Upon exiting the curing die 160, the cured part or product 112 is allowed to cool at room temperature in a step 250 (FIG. 7) to a temperature that allows handling of the part. According to an exemplary embodiment, cooling of the product 112 is performed in a passive cooling process in which air circulates around the part over a distance of approximately 10 feet. According to other exemplary embodiments, the distance through which the product travels in the cooling process may differ (e.g., the distance may be greater or less than 10 feet). According to still other exemplary embodiments, forced air or another cooling system may be utilized to cool the part (e.g., a chilled water bath, etc.).

The cured product 112 is extracted from the curing die 160 by application of a tensile force produced by a puller 170. The puller 170 may be provided as a reciprocating gripping system or a continuous caterpillar-like gripping system.

In a step 260 (FIG. 7), the cured product 112 is cut to specific lengths using a saw 180 or similar device. The saw is configured to automatically cut the cured product 112 to specified lengths, and may be controlled by a computing device or other mechanism. According to an exemplary embodiment, the saw is made of a material configured to form cuts in reinforced plastic components (e.g., a carbide or diamond abrasive material).

Those reviewing this disclosure will appreciate that the system and method for wetting the fibers and fiber tows may provide various advantages as compared to conventional wetting systems. For example, the system and method described according to the exemplary embodiments allow for the production of fiber-reinforced plastic products in a high-speed continuous process, with sufficient strength, stiffness and environmental resistance to make them suitable for use as structural members in architectural applications such as windows, doors and exterior fascia of commercial and residential construction.

It is important to note that the resin composition described in the various exemplary embodiments is illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A resin precursor composition comprising: an isocyanate component; a first polyol having a molecular weight of between about 600 and 800 and an OH index of between about 200 and 300 mgOH/g;
   a second polyol having a molecular weight of between about 100 and 300 and an OH index of between about 935 and 1,200 mgOH/g;
   wherein the first polyol and the second polyol form a blend that has an OH index of between about 350 and 700 mgOH/g; and
   wherein the cured resin precursor composition has an elastic modulus of between about 350,000 and 500,000 psi and an elongation-to-failure of between about 6% and 15%.

2. The resin precursor composition of claim 1, further comprising a polymeric additive configured to reduce shrinkage of the resin precursor composition as it cures.

3. The resin precursor composition of claim 2, wherein the polymeric additive is selected from the group consisting of polystyrene, methacrylate resin, polyvinyl acetate, capped PPO, and a styrene-acrylic copolymer.

4. The resin precursor composition of claim 1, wherein the ratio of the isocyanate component to the blend is between approximately 80% and 115% of stoichiometric.

5. The resin precursor composition of claim 1, wherein the isocyanate component comprises a material selected from the group consisting of diphenylmethane diisocyanate, a polymeric isomer of diphenylmethane diisocyanate, and combinations thereof.

6. The resin precursor composition of claim 1, wherein at least one of the first and second polyols is a polyether polyol.

7. The resin precursor composition of claim 1, wherein at least one of the first and second polyols is a polyester polyol.

8. A resin precursor composition comprising: an isocyanate component;
   a first polyol having a molecular weight of between about 600 and 800 and an OH index of between about 200 and 300 mgOH/g;
   a second polyol having a molecular weight of between about 100 and 300 and an OH index of between about 935 and 1,200 mgOH/g;
   and a third polyol having a molecular weight of between about 200 and 300 and an OH index of between about 500 and 700 mgOH/g; and
   wherein the first polyol, the second polyol, and the third polyol form a blend having an OH index between about 350 and 750 mgOH/g; and
   wherein the cured resin precursor composition has an elastic modulus of between between about 350,000 and 500,000 psi and an elongation-to-failure of between about 6% and 15%.

9. The resin precursor composition of claim 8, wherein the first, second, and third polyols form a blend that comprises between approximately 20% and 50% of the first polyol, between approximately 20% and 50% of the second polyol, and between approximately 20% and 40% of a third polyol.

10. The resin precursor composition of claim 1, further comprising a mold release material and a filler material.

11. The resin precursor composition of claim 10, wherein the mold release material is provided in an amount of between approximately 0.5% and 5% of the total mass of the resin precursor composition and the filler is provided in an amount of between approximately 0.5% and 10% of the total mass of the resin precursor composition.

12. The resin precursor composition of claim 11, wherein the filler component is present in an amount that is substantially equal to the mass percentage of the mold release material.

13. A method for producing a resin precursor composition comprising:
   mixing at least~three polyether polyols with a mold release material and a filler material to form a first resin precursor component; and
   mixing a second component with the first component to form a resin precursor composition, the second component comprising an isocyanate material;
   wherein a first of the three polyether polyols has a molecular weight of between about 600 and 800 and an OH index of between about 200 and 300 mgOH/g and a second of the three polyether polyols has a molecular weight of between about 100 and 300 and an OH index of between about 935 and 1,200 mgOH/g and the third of the three polyether polyols has a molecular weight of between about 200 and 300 and an OH index of between about 500 and 700 mgOH/g;
   wherein the first polyol, the second polyol, and the third polyol form a blend having an OH index between about 350 and 750 mgOH/g; and
   wherein the cured resin precursor composition has an elastic modulus of between about 350,000 and 500,000 psi and an elongation-to-failure of between about 6% and 15%.

14. The method of claim 13, wherein the step of mixing the second component with the first component is performed less than approximately five minutes before the resin precursor composition is to be provided to an impregnation die of a pultrusion process.

15. The method of claim 13, wherein the step of mixing the second component with the first component is performed at a rate that matches the rate of consumption of the resin precursor composition in a pultrusion process.

16. The method of claim 13, further comprising providing the resin precursor composition into an impregnation die of a pultrusion process.

17. The method of claim 16, wherein the mold release material comprises an acid that is attracted to walls of the impregnation die.

18. The method of claim 16, wherein a portion of the mold release material reacts with the filler material to form a metal soap.

19. The resin precursor composition of claim 1, wherein the first polyol and the second polyol both have a hydroxy group functionality of three.

20. The resin precursor composition of claim 8, wherein the second polyol has a molecular weight of between approximately 100 and 300 and has an OH index of between approximately 935 and 1050 mgOH/g.

21. The resin precursor composition of claim 8, wherein the second polyol has a molecular weight of between approximately 150 and 190.

22. The resin precursor composition of claim 8, wherein the first polyol, the second polyol and the third polyol each has a hydroxy group functionality of three.

23. The resin precursor composition of claim 8, wherein each of the first polyol, the second polyol and the third polyol is a polyether polyol.

24. The resin precursor composition of claim 8, wherein the second polyol has a molecular weight of between approximately 150 and 190 and an OH index of between approximately 935 and 1050 mgOH/g, and further wherein each of the first polyol, the second polyol and the third polyol is a polyether polyol.

25. The resin precursor composition of claim 24, wherein the first polyol, the second polyol and the third polyol each has a hydroxy group functionality of three.

26. The resin precursor composition of claim 1, wherein the second polyol has a molecular weight of between approximately 150 and 190.

27. The resin precursor composition of claim 1, wherein the second polyol has a molecular weight of between approximately 100 and 300 and has an OH index of between approximately 935 and 1050 mgOH/g.

* * * * *